United States Patent Office 3,072,638
Patented Jan. 8, 1963

3,072,638
CEVANIDANE DERIVATIVES AND PROCESS FOR THE PREPARATION THEREOF
Philip A. Cruickshank and John C. Sheehan, Lexington, Mass., assignors to Research Institute for Medicine and Chemistry, Inc., Cambridge, Mass., a corporation of Massachusetts
No Drawing. Filed July 29, 1960, Ser. No. 46,098
13 Claims. (Cl. 260—239.5)

This invention relates to a process for rearranging the structure of steroids having a tertiary nitrogen as a beta-substituent at the C–16 position and in which the C–18 is the carbon of a carboxylic acid group to form new and useful steroid compounds. In particular it relates to new and useful steroid lactams and amines prepared from solanidane-18-oic acid and its derivatives. The essential result of the process is the transfer of the nitrogen atom from the C–16 to the C–18 position and the simultaneous introduction at the C–16 position of an alpha-substituent.

In its general form the invention comprises reacting such steroids, as, for example, solanidane-18-oic acid or a derivative thereof, with an activating agent selected from the group consisting of anhydrides of carboxylic acids and halide compounds which are reactive with carboxylic acid to form carbonyl halides. Examples of such activating agents include acetic anhydride, propionic anhydride, butyric anhydride, benzoic anhydride, thionyl chloride, phosphorus oxychloride, phorphoryl pentachloride, etc. When reacted with such an activating agent, the solanidane compound is split at the C–16–N linkage, with the N rejoining at C–18 to form a new E-ring having an 18, 22, 26 lactam. A group derived from the activating agent is formed at the C–16 position which can be readily converted to hydroxy thence to other derivatives such as carboxy ester, halide or carbonyl without changing the steroid skeletal structure. The products of this invention are novel and have valuable physiological properities such as hypotensive and isotropic activity. "Hypotensive activity refers to the property of lowering blood pressure, while inotropic activity refers to the property of influencing muscular activity.

Inasmuch as the rearrangement has changed the skeleton of the solanidane structure, a new name, namely, "cevanidane" (I) is proposed for the ring system of the products of this invention. No naturally occurring alkaloid has yet been found to have the cevanidane skeleton, such being intermediate between the solanidane (II) skeleton and the cevane (III) and jervine type (IV) skelton.

In its preferred form the process of this invention comprises dissolving the starting material in the activating agent, refluxing, and then diluting the hot solution with water. 80%–90% yields of the neutral products crystallized spontaneously where acetic anhydride was used. Isolation of the products where other activating agents were used can be accomplished but is somewhat more difficult. Where acetic anhydride is used a C–16 acetoxy group results which is hydrolyzable to hydroxy which in turn is oxidizable to carbonyl.

The new products of this invention comprise generally the class of cevanidane compounds having oxygen substituents at C–3 and alpha oriented substituents or hydrogen at C–16. C–18 is either unsubstituted or has an oxo group. No single compound is unsubstituted in both the C–16 and C–18 positions. With respect to the C–3 and C–16 positions the oxygen substituents are selected from the group consisting of oxo, hydroxy, acyloxy, alkoxy, aryloxy, alkysulfonoxy, arylsulfonoxy, halido and ketal. This new class of compounds and its precursors can have other substituents or olefinic unsaturation in various positions, as, for example, in rings A and B. The only substantial limitation on having other substituents or olefinic unsaturation in the C, D or E rings is that, in the case of the precursor, they should not be reactive with the activated COOH group. These compounds all have valuable physiological properties, as, for example, hypotensive activity. Those with outstanding activity in this regard are:

3-beta, 16-alpha-diacetoxy-18-oxo-5-cevanidene (X)
3-beta,, 16-alpha-dihydroxy-5-cevanidene (XI)
16-alpha-acetoxy-18-oxocevanidane3-one (XVa)
16-alpha-acetoxy-18-oxo-4-cevanidene-3-one (XVb)
16-alpha-hydroxycevanidane-3-one (XXVIa)

In addition, the quaternized derivatives of these compounds such as 16-alpha-hydroxy-cevanidane-3-cycloethylene ketal methiodide (XXXII) have valuable physiological properties, as, for example, sympatholytic activity.

The cevanidane compounds of this invention with hydrogen at the C–18 position have a substantially stable ring structure. However, where there is an oxo group at C–18, the solanidane structure will be regenerated if the compound is treated with a strong mineral acid such as a hydrochloric acid or phosphoric acid. Also, regeneration is accomplished by lithium aluminum hydride where there is at C–16 position a chloro, bromo, iodo or sulfonoxy substituent. Apart from these regeneration reactions the compounds of this invention may be reacted in accordance with the prior art of steroid chemistry including various reactions for hydrolysis, oxidation, esterification, reduction and the like. This applies particularly to the placing of desired substituents at the C–3 and C–16 positions. Also, the oxo group is readily removed from the C–18 position by lithium aluminum hydride reduction except where the C–16 substituents are chloro, bromo, iodo, or sulfonoxy.

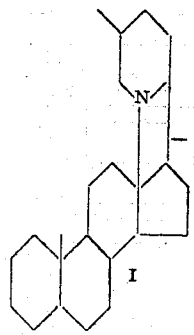

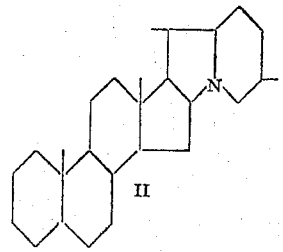

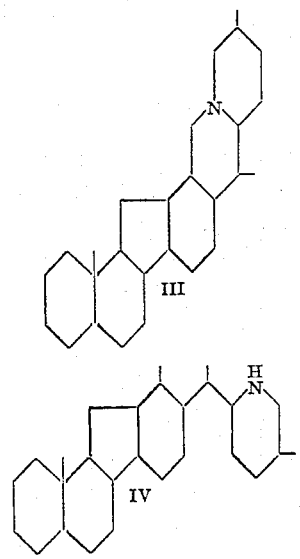

Chromic acid oxidation of the isorubijervine hydroxymethyl group served to prepare the solanidane-18-oic acids used as precursors for the 18-oxo-cevanidane derivatives. Direct oxidation of dihydro-isorubijervine with Kiliani's solution afforded solanidane-3-one-18-oic acid (XIVa). Preparation of 4-solanidene-3-one-18-oic acid (XIV) required two steps: initial oxidation of isorubijervine (VI) to 18-hydroxy-4-solanidene-3-one (XIIb) by the Oppenhauer procedure, followed by oxidation at C(18) with a modified Kiliani's reagent. A three step procedure was necessary for the preparation of 3-beta-acetoxy-5-solanidene-18-oic acid (IX): chromium trioxide oxidation of isorubijervine to give the 18-aldehyde VII, acetylation of the 3-hydroxyl group (VIII), and further oxidation of the aldehyde to carboxyl with chromic acid.

|  | X | R |  |
|---|---|---|---|
| VII | OH | CHO | Δ5 |
| VIII | OAc | CHO | Δ5 |
| IX | OAc | $CO_2H$ | Δ5 |
| XIIb | O | $CH_2OH$ | Δ5 |
| XIIIa | [O>O] | OH |  |
| XIVa | O | $CO_2H$ |  |
| XIVb | O | $CO_2H$ | Δ4 |

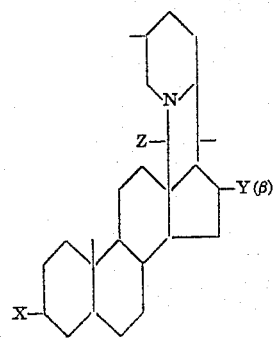

|  | X | Y | Z |  |
|---|---|---|---|---|
| X | OAc | OAc | O | Δ5 |
| XI | OH | OH |  | Δ5 |
| XVa | O | OAc | O |  |
| XVb | O | OAc | O | Δ5 |
| XVIa | O | OH | O |  |
| XVIIa | [O>O] | OAc | O |  |
| XVIIb | [O>O] | OAc | O | Δ5 |
| XVIIIa | [O>O] | OH | O |  |
| XIXa | [O>O] | OTs | O |  |
| XXa | [O>O] | Cl | O |  |
| XXI | O | O | O |  |
| XXII | [O>O] | O | O |  |
| XXIII | [O>O] |  | O |  |
| XXIV | O |  | O |  |
| XXVa | [O>O] | OH |  |  |
| XXVIa | O | OH |  |  |
| XXVII | O | O |  |  |
| XXXI | OH |  |  | Δ5, Δ15 |
| XXXII | [O>O] | OH |  | $CH_3I$ |

Specific examples of the products and processes of this invention are illustrated below.

EXAMPLE 1

*3-Beta-Acetoxy-5-Solanidene-18-Oic Acid (IX)*

A solution of 4.14 g. (0.01 mole) of isorubijervine in 100 ml. of 90% acetic acid was cooled in an ice bath; 0.70 g. of chromium trioxide dissolved in 10 ml. of 90% acetic acid was added during 30 minutes. After standing at room temperature for 18 hours, the excess chromium trioxide was destroyed with alcohol, and the solvents removed under reduced pressure. The oily residue was taken up in 50 ml. of water and the product precipitated by making the solution basic with 10% aqueous sodium carbonate. Recrystallization from ethanol gave 3.18 g. (77%) of 3-beta-hydroxy-5-solanidene-18-al (VII), M.P. 214–215°, $[\alpha]_D^{28}$ +5.5° (c. 0.7 $CHCl_3$), $\nu_{Max.}^{KBr}$ 3300 cm.$^{-1}$, 1700 cm.$^{-1}$

*Analysis.*—Calcd. for $C_{27}H_{41}NO_2$: C, 78.78; H, 10.04; N, 3.41. Found: C, 78.31; H, 10.24; N, 3.96.

A solution containing 1.0 g. of 3-beta-hydroxy-5-solanidene-18-al (VII) in 10 ml. of acetic anhydride and 10 ml. of pyridine was stored 16 hours at room temperature. After dilution with ice water the mixture was made basic with 10% aqueous sodium carbonate and the product extracted with several portions of methylene chloride. The combined extracts were dried over magnesium sulfate and concentrated under reduced pressure. Crystallization of the solid residue from methanol-water afforded 0.70 g. (64%) of 3-beta-acetoxy-5-solanidene-18-al (VIII), M.P. 203–203.5°.

*Analysis.*—Calcd. for $C_{29}H_{43}NO_2$: C, 76.78; H, 9.55; N, 3.09. Found: C, 76.95; H, 9.50; N, 3.00.

To 0.25 g. of VIII dissolved in 60 ml. of acetone there was added 0.3 ml. of a chromic acid oxidizing solution (26.72 gm. chromium trioxide in 23 ml. conc. sulfuric acid diluted to 100 ml.). After twenty minutes at room temperature the mixture was made basic with 20 ml. of saturated aqueous sodium bicarbonate and was concentrated to a small volume. The solid was collected by filtration and washed thoroughly with 95% ethanol; upon evaporation to dryness the filtrate left a solid residue which was transferred to a filter and washed thoroughly with water; 0.24 g. (90%) of sodium 3-beta-acetoxy-5-solanidene-18-oic acid was obtained.

An aqueous suspension of the sodium salt was adjusted to pH 6–7 with hydrochloric acid and acetic acid, and the acid IX recovered as its hydrochloride by extraction with methylene chloride. The product was crystallized from methylene chloride and acetone, M.P. 296–298°, $[a]_D$ −13° (c.=0.69 $CHCl_3$).

Analysis.—Calcd. for $C_{29}H_{43}NO_4 \cdot HCl$: C, 68.82; H, 8.76; N, 2.67; Cl, 7.01. Found: C, 68.90; H, 8.58; N, 2.74; Cl, 7.23.

EXAMPLE 2

4-Solanidene-3-One-18-Oic Acid (XIVb)

To 1.6 g. of 18-hydroxy-4-solanidene-3-one (XIIb) prepared by method of W. A. Jacobs and L. C. Craig, J. Biol. Chem., 159, 617 (1945), dissolved in 80 ml. of 90% acetic acid there was added 24 ml. of Kiliani's reagent.[20] The reaction was stirred 12 hours in a melting ice bath, after which excess oxidizing reagent was destroyed by adding 10 ml. of ethanol. The mixture was diluted with water, made basic with concentrated ammonium hydroxide, and exhaustively extracted with chloroform. After drying over anhydrous magnesium sulfate the extracts were evaporated to dryness, and the oil residue crystallized by trituration with acetone; the yield of 4-solanidene-3-one-18-oic acid (XIVb) was 0.83 g. (53%), M.P. 278–281°. Recrystallization from methylene chloride-acetone gave pure material, M.P. 282–285°, $[a]_D$ 108° (c., 1.79 $CHCl_3$).

Analysis.—Calcd. for $C_{27}H_{39}O_3N$: C, 76.19; H, 9.24; N, 3.29. Found: C, 76.19; H, 9.46; N, 3.53.

EXAMPLE 3

Solanidane-3-One-18-Oic Acid (XIVa)

This compound was prepared by direct oxidation of dihydroisorubijervine with Kiliani's solution (53 g. chromium trioxide, 80 g. concentrated sulfuric acid and 400 ml. water) as described by Sato and Jacobs, J. Biol. Chem. 191, 63 (1951).

EXAMPLE 4

3-Beta, 16α-Diacetoxy-18-Oxo-5-Cevanidene (X)

From 0.48 g. of sodium 3-beta-acetoxy-5-solanidene-18-oate (IX) and 15 ml. of acetic anhydride there was obtained 0.33 g. (66%) of 3-beta, 16α-diacetoxy-18-oxo-5-cevanidene (X), M.P. 227.5–230°. Recrystallization from ethanol-water gave an analytical sample, M.P. 228.5–230.5°, $[a]_D^{23}$ −75.2 (c. 0.95 $CHCl_3$), $v_{Max.}^{KBr}$ 1735 cm.$^{-1}$, 1725 cm.$^{-1}$, 1630 cm.$^{-1}$, and 1248 cm.$^{-1}$ Analysis.—Calcd. for $C_{31}H_{45}NO_5$: C, 72.76; H, 8.86; N, 274. Found: C, 72.86; H, 8.89; N, 2.66.

EXAMPLE 5

16α-Acetoxy-18-Oxo-4-Cevanidene-3-One (XVb)

A 90% yield of (XVb) was obtained from 0.72 gm. of 4-solanidene-3-one-18-oic acid (XIVb) in 15 ml. of acetic anhydride. After recrystallization from ethanol-water the substance was analytically pure: M.P. 242–244.5°, $[a]_D^{23}$, −6.3 (c. 0.9 $CHCl_3$)

$v_{Max.}^{KBr}$ 1730 cm.$^{-1}$, 1665 cm.$^{-1}$, 1620 cm.$^{-1}$, and 1240 cm.$^{-1}$ Analysis.—Calcd. for $C_{29}H_{41}NO_4$: C, 74.48; H, 8.84; N, 3.00. Found: C, 74.62; H, 8.93; N, 3.04.

EXAMPLE 6

16-Alpha-Acetoxy-18-Oxocevanidane-3-One (XVa)

This compound was obtained in 89% yield from 1.5 g. of solanidane-3-one-18-oic acid (XIVa) (Sato and Jacobs, J. Biol. Chem. 191, 63 (1951)) in 50 ml. of acetic anhydride. Recrystallization from ethanol-water afforded material of M.P. 255.5–258.5°, $[a]_D^{21}$ −40.5 (c. 1.0 $CHCl_3$)

$v_{Max.}^{KBr}$ 1730 cm.$^{-1}$, 1710 cm.$^{-1}$, 1630 cm.$^{-1}$, and 1240 cm.$^{-1}$ Analysis.—Calcd. for $C_{29}H_{43}NO_4$: C, 74.16; H, 9.23; N, 2.98. Found: C, 74.43; H, 9.19; N, 2.80.

EXAMPLE 7

16-Alpha-Hydroxy-18-Oxo-Cevanidane-3-One (XVIa)

Saponification of the acetate group was readily effected with methanolic potassium hydroxide. From 1.17 g. of 16a-acetoxy-18-oxo-cevanidane-3-one (XIVa) and 1.0 g. of potassium hydroxide dissolved in 25 ml. of methanol there was obtained 1.04 g. (98%) of product. The reaction mixture was left at room temperature for 15 hours, then acidified with 10% aqueous hydrochloric acid and diluted with water on a steam bath until the product crystallized. Recrystallization from methanol-water gave analytically pure 16a - hydroxy-18-oxo-cevanidane-3-one (XVIa) as its monohydrate, M.P. 135° dec. followed by resolidification and M.P. 217–218°, $[a]_D^{24}$ −19 (c. 1.1 pyridine)

$v_{Max.}^{KBr}$ 3400 cm.$^{-1}$, 1710 cm.$^{-1}$, and 1630 cm.$^{-1}$

Analysis.—Calcd. for $C_{27}H_{41}NO_3 \cdot H_2O$: C, 72.77; H, 9.73; N, 3.14. Found: C, 72.59; H, 9.72; N, 3.24.

A tosylate derivative of this compound was prepared by the action of p-toluenesulfonyl chloride on XVIa in pyridine solution at room temperature. After recrystallization from acetone-water the product had a M.P. 180–182°.

Analysis.—Calcd. for $C_{34}H_{47}NO_3S$: C, 70.19; H, 8.14; N, 2.41. Found: C, 69.94; H, 8.12; N, 2.25.

EXAMPLE 8

18-Oxocevanidane-3.16-Dione (XXI)

A solution of 90 mg. of 16a-hydroxy-18-oxocevanidane-3-one (XVIa) in 20 ml. of 90% acetic acid was treated with 2.0 ml. of Kiliani's reagent (53 g. $CRO_3$, 80. g. conc. sulfuric acid, 40 ml. water). The reaction mixture was left at room temperature for 15 hours then was diluted with 100 ml. of water and extracted with chloroform. After washing with 5% aqueous sodium bicarbonate the combined extracts were dried over anhydrous magnesium sulfate and evaporated to dryness. Crystallization of the solid residue from absolute methanol gave 18-oxo-cevanidane-16-one-3-dimethyl ketal, M.P. 192–193°

$v_{Max.}^{KBr}$ 1740 cm.$^{-1}$ and 1630 cm.$^{-1}$

Analysis.—Calcd. for $C_{29}H_{45}NO_4$: C, 73.84; H, 9.62. Found: C, 73.99; H, 9.33.

Upon warming the dimethyl ketal in 50% acetic acid, followed by dilution with water, 18-oxocevanidane-3,16-dione (XXI) was obtained. Recrystallization from acetone-water afforded material of M.P. 222–225°, $[a]_D$ −148 (c. 1.0 pyridine)

$v_{Max.}^{KBr}$ 1740 cm.$^{-1}$, 1719 cm.$^{-1}$, and 1630 cm.$^{-1}$

Analysis.—Calcd. for $C_{27}H_{39}NO_3$: C, 76.19; H, 9.24; N, 3.29. Found: C, 75.66; H, 9.17; N, 3.36.

EXAMPLE 9

16-Alpha-Chloro-18-Oxocevanidane-3-One

A pyridine solution (25 ml.) containing 0.60 g. of 16-alpha-hydroxy-18-oxo-cevanidane-3-one and 0.60 g. of p-toluenesulfonyl chloride was heated under reflux for 16 hours. After cooling, the reaction mixture was poured into 100 ml. of water, and the oil which separated was induced to crystallize by trituration. Recrystallization from methanol-water gave 0.48 g. (80%) of 16a-chloro-18-oxocevanidane-3-one, M.P. 218–228°. A second recrystallization from the same solvent gave an analytical sample, M.P. 229–231°, $[a]_D$ −3.9 (c. 1.0 pyridine)

$v_{Max.}^{KBr}$ 1710 cm.$^{-1}$, 1630 cm.$^{-1}$

*Analysis.*—Calcd. for $C_{27}H_{40}NO_2Cl$: C, 72.70; H, 9.04; N, 3.14; O, 7.17; Cl, 7.95. Found: C, 72.72, 72.76; H, 9.04, 9.14; N, 3.15; O, 7.27; Cl, 7.23.

EXAMPLE 10

*16-Alpha-Acetoxy-18-Oxocevanidane-3-Cycloethylene Ketal (XVIIa)*

From 5.6 g. of 16a-acetoxy-18-oxocevanidane-3-one (XVa) there was obtained 6.07 g. (98%) of XVIIa. The product was crystallized from 95% ethanol, M.P. 249–251°, $[a]_D$ −54 (c. 1.44 pyridine).

*Analysis.*—Calcd. for $C_{31}H_{47}NO_5$: C, 72.47; H, 9.22; N, 2.73. Found: C, 72.40; H, 9.24; N, 2.41.

Reaction of XVIIa with p-toluenesulfonyl chloride in pyridine at room temperature afforded 89% of 16a-tosyloxy-18-oxocevanidane-3-cycloethylene ketal (XIXa). Crystallization from acetone water gave pure material of M.P. 169–171°, $[a]_D$ −37 (c. 1.05 pyridine).

*Analysis.*—Calcd. for $C_{36}H_{51}NO_6S$: C, 69.08; H, 8.21. Found: C, 69.09; H, 8.21.

EXAMPLE 11

*16-Alpha-Acetoxy-18-Oxo-5-Cevanidene-3-Cycloethylene Ketal (XVII)*

A quantitative yield of XVIIb was obtained from 0.43 g. of 16a-acetoxy-18-4-cevanidene-3-one (XVb). Recrystallization from cyclohexane afforded the analytical sample, M.P. 102° dec. The material analyzed as a cyclohexane solvate.

*Analysis.*—Calcd. for $C_{31}H_{45}NO_5C_6H_{12}$: C, 74.58; H, 9.64. Found: C, 74.19; H, 9.51.

EXAMPLE 12

*16-Alpha-Hydroxy-18-Oxocevanidane-3-Cycloethylene Ketal (XVIIIa)*

From 450 mg. of 16a-hydroxy-18-oxocevanidane-3-one (XVIa) there was obtained 475 mg. (100%) of 16a-hydroxy-18-oxocevanidane-3-cycloethylene ketal (XVIIIa), M.P. 155–157°. Recrystallization from acetone-water gave material of M.P. 157–159°, $[a]_D$ −23.5 (c. 0.68 pyridine)

$v_{Max.}^{KBr}$ 3300 cm.$^{-1}$ and 1630 cm.$^{-1}$

*Analysis.*—Calcd. for $C_{29}H_{45}NO$: C, 73.84; H, 9.62. Found: C, 74.01; H, 9.55.

EXAMPLE 13

*16-Alpha-Chloro-18-Oxocevanidane-3-Cycloethylene Ketal (XXa)*

An 84% yield (1.43 g. of XXa was obtained from 1.54 g. of 16 - alpha - chloro - 18-oxocevanidane-3-one, M.P. 247.5–249.5° from ethanol. Recrystallization from cyclohexane gave pure material, M.P. 252–254°, $[a]_D$ −21 (c. 1.0 pyridine)

$v_{Max.}^{KBr}$ 1630 cm.$^{-1}$

*Analysis.*—Calcd. for $C_{29}H_{44}ClN_3O$: C, 71.06; H, 9.05; N, 2.86. Found: C, 70.75; H, 9.32; N, 2.90.

EXAMPLE 14

*18-Oxocevanidane-16-One-3-Cycloethylene Ketal (XXII)*

A solution of 2.0 g. of 16-alpha-hydroxy-18-oxocevanidane-3-cycloethylene ketal (XVIIIa) in 60 ml. of pyridine was added to 0.535 g. of chromium trioxide in 30 ml. of pyridine. After 16 hours at 25° the mixture was diluted with water and extracted with a 1:1 benzene-ether mixture. The combined extracts were washed with water, dried over "Drierite" and concentrated under reduced pressure. Crystallization of the residue from methanol-acetone gave 1.30 g. of pure 18-oxocevanidane-16-one-3-cycloethylene ketal (XXII). Concentration of the mother liquids and reoxidation under the same conditions afforded an additional 0.64 g. of product; the total yield was 98%. Recrystallization from methanol-acetone gave an analytical sample, M.P. 282–284.5° after softening at 276° $[a]_D$ −133° (c. 1.46 CHCl$_3$)

$v_{Max.}^{CHCl_3}$ 1740 cm.$^{-1}$, 1620 cm.$^{-1}$, 1250 cm.$^{-1}$, and 1160–1060 cm.$^{-1}$

*Analysis.*—Calcd. for $C_{29}H_{43}N$: C, 74.16; H, 9.23; N, 2.98. Found: C, 73.88; H, 9.11; N, 3.00.

EXAMPLE 15

*18-Oxocevanidane-3-Cycloethylene Ketal (XXIII)*

A mixture of 1.30 g. of 18-oxocevanidane-16-one-3-cycloethylene ketal (XXII), 10 ml. of anhydrous hydrazine and 10 g. of potassium hydroxide in 170 ml. of ethylene glycol was distilled slowly until the temperature reached 190°. An additional 10 ml. of hydrazine was then added and the distillation continued for 3 hours. After cooling, the mixture was diluted with 200 ml. of water and exhaustively extracted with methylene chloride. The combined extracts were washed with water, dried over "Drierite," and taken to dryness under reduced pressure. Crystallization from methanol afforded 0.90 g. (71%) of 18-oxocevanidane-3-cycloethylene ketal (XXIII). An analytical sample recrystallized from methanol had M.P. 203–205°, $[a]_D$+20 (c. 1.05 CHCl$_3$)

$v_{Max.}^{KBr}$ 1620 cm.$^{-1}$, 1260 cm.$^{-1}$, and 1180–1080 cm.$^{-1}$

*Analysis.*—Calcd. for $C_{29}H_{45}O_3N$: C, 76.43; H, 9.95; N, 3.07. Found: C, 76.52; H, 9.87; N, 3.18.

EXAMPLE 16

*18-Oxocevanidane-3-One (XXIV)*

A solution of 60 mg. of 18-oxocevanidane-3-cycloethylene ketal (XXII) in 15 ml. of glacial acetic acid and 5 ml. of 20% hydrochloric acid was heated under reflux in a nitrogen atmosphere for two weeks. The residue remaining after removal of the solvent under reduced pressure was crystallized from methylene chloride-hexane to give 40 mg. (74%) of 18-oxocevanidane-3-one (XXIV), M.P. 196–200°. Recrystallization from the same solvents afforded material of M.P. 202–203°, $[a]_D$ −27 (c. 1.20 CHCl$_3$)

$v_{Max.}^{KBr}$ 1715 cm.$^{-1}$, 1626 cm.$^{-1}$, and 1340 cm.$^{-1}$

*Analysis.*—Calcd. for $C_{27}H_{41}NO_2$: C, 78.78; H, 10.04; N, 3.40. Found: C, 78.51; N, 10.09; N, 3.41.

*Lithium aluminum hydride reduction.*—The lithium aluminum hydride reductions were carried out in tetrahydrofuran (THF) solution with a large excess of the reducing agent. Reaction mixtures usually were heated under reflux for 12–18 hours, after which excess hydride was decomposed by the addition of ethyl acetate. Further processing of the reaction mixture was by one of two procedures.

(1) The inorganic salts were precipitated by the addition of a small amount of water dissolved in tetrahydrofuran (THF); after filtering, the salts were thoroughly washed with hot tetrahydrofuran (THF), and the combined filtrates evaporated to afford the solid products.

(2) The reaction mixture was diluted with a 20% aqueous solution of sodium and potassium tartrate, and the resultant mixture extracted with methylene chloride; after drying the combined extracts were evaporated to give the products.

EXAMPLE 17

*18-Hydroxysolanidane-3-Cycloethylene Ketal (XIIIa)*

I. *From 16 - alpha - chloro-18-oxocevanidane-3-cycloethylene ketal (XXa).*—Reduction of 0.55 g. of XXa with 0.15 g. of lithium aluminum hydride in 10 ml. of tetrahydrofuran (THF) afforded 0.30 g. (59%) of 18-hydroxy-3-cycloethylene ketal (XIIIa); work-up was by procedure (1). Recrystallization from ethanol gave an analytical sample, M.P. 227.5–230–5°, $[a]_D^{25}$ +30 (c. 2.0 CHCl$_3$).

*Analysis.*—Calcd. for C$_{29}$H$_{47}$NO$_3$: C, 76.10; H, 10.35; N, 3.06. Found: C, 76.20; H, 10.31; N, 3.09.

II. *From 16-alpha-tosyloxy-18-oxocevanidane-3-cycloethylene ketal (XIXa).*—A 45% yield of 18-hydroxysolanidane-3-cycloethylene ketal was obtained using the same quantities and procedure as described above for the chloro compound. The purified product had a M.P. 227–230° (mixture M.P. with material from reduction of chloro compound was undepressed), $[a]_D^{25}$ +30° (c. 2.0 CHCl$_3$).

*Analysis.*—Calcd. for C$_{29}$H$_{47}$NO$_3$: C, 76.10; H, 10.35; N, 3.06. Found: C, 76.04; H, 10.33; N, 2.93.

EXAMPLE 18

*16-Alpha-Hydroxycevanidane-3-Cycloethylene Ketal (XXVa)*

From 0.514 g. of 16-alpha-acetoxy-18-oxocevanidane-3-cycloethylene ketal (XVIIa) there was obtained a quantitative yield (0.46 g. of 16-alpha-hydroxycevanidane-3-cycloethylene ketal (XXVa); the product was isolated from the reaction mixture by procedure (2). Two recrystallizations from acetone afforded material of M.P. 212–5–216°, $[a]_D$ −23.7 (c. 1.2 pyridine).

*Analysis.*—Calcd. for C$_{29}$H$_{47}$NO$_3$: C, 76.10; H, 10.35; N, 3.06. Found: C, 76.45; H, 10.58; N, 3.25.

EXAMPLE 19

*3-Beta, 16-Alpha-Dihydroxy-5-Cevanidene (XI)*

A quantitative yield of XI was obtained upon reduction of 0.45 g. of 3-beta, 16-alpha diacetoxy-18-oxo-5-cevanidene with 0.40 g. of lithium aluminum hydride in 25 ml. of THF; procedure (2) was utilized for isolation of the product. Recrystallization from ethanol-water gave the analytical sample, M.P. 229–233°, $[a]_D$ −35.5 (c. 2.4 pyridine).

*Analysis.*—Calcd. for C$_{27}$H$_{43}$NO$_2$·½H$_2$O: C, 76.73; H, 10.49; N, 3.31. Found: C, 76.37; H, 10.27; N, 3.28.

EXAMPLE 20

*16-Alpha-Hydroxycevanidane-3-Cycloethylene Ketal Methiodide (XXXII)*

A mixture of 0.30 g. 16-alpha-hydroxycevanidane-3-cycloethylene ketal (XXVa), 6 ml. methyl iodide, 5 g. potassium carbonate, and 50 ml. acetone was heated under reflux with stirring for 18 hours. The hot mixture was filtered and the filter cake washed thoroughly with acetone. Evaporation of the filtrate gave a solid residue which was triturated with ether and with chloroform; crystallization of the remaining material from water gave 0.26 g. (66%) of methiodide, M.P. 271–275°.

*Analysis.*—Calcd. for C$_{30}$H$_{50}$NO$_3$I: C, 60.09; H, 8.41; I, 21.17. Found: C, 59.85; H, 8.26; I, 21.19.

EXAMPLE 21

*16-Alpha-Hydroxycevanidane-3-One (XXVIa)*

The ketal group of 16 alpha hydroxycevanidane-3-cycloethylene ketal (XXVa) was cleaved by warming the compound in 20% aqueous acetic acid on a steam bath for 30 minutes. Removal of solvents under reduced pressure left a colorless oil which solidified upon trituration with 5% aqueous sodium bicarbonate. From 0.35 g. of XXVa there was obtained 0.31 g. (98%) of crude 16-alpha-hydroxycevanidane-3-one (XXVIa); two recrystallizations from ethanol-water gave a pure sample, M.P. 207.5–210°, $[a]_D^{25}$ −42.7 (c. 1.28 CHCl$_3$).

*Analysis.*—Calcd. for C$_{27}$H$_{43}$NO$_2$: C, 78.40; H, 10.48; N, 3.39. Found: C, 78.31; H, 10.54; N, 3.80.

The acetate was prepared by the pyridine-acetic anhydride procedure; M.P. 163–167.5° after recrystallization from acetone-water, $[a]_D^{24}$ −44 (c. 1.22 pyridine).

*Analysis.*—Calcd. for C$_{29}$H$_{45}$NO$_3$: C, 76.44; H, 9.95; N, 3.07. Found: C, 76.33; H, 9.90; N, 3.26.

EXAMPLE 22

*Cevanidane-3,16-Dione (XXVII)*

To a solution of 0.11 g. of 16-alpha-hydroxycevanidane-3-one (XXVIa) in 15 ml. of acetone there was added sufficient Kiliani's reagent to give a permanent range color. Addition of a few drops of water gave a green oily phase which was removed by filtration through "Celite." The filtrate was made basic with N aqueous sodium hydroxide and was diluted with water; an oil separated which solidified upon trituration to give a quantitative yield of cevanidane-3,16-dione (XXVII). Recrystallization from acetone-water gave pure material, M.P. 158–161°, $[a]_D^{24}$ −84 (c. 1.02 pyridine), $$v_{Max.}^{KBr}\ 1740\ cm.^{-1}\ \text{and}\ 1710\ cm.^{-1}$$

*Analysis.*—Calcd. for C$_{27}$H$_4$NO$_2$: C, 78.78; H, 10.04; N, 3.40. Found: C, 78.66; H, 10.15; N, 3.67.

In addition to the new class of cevanidane compounds described and exemplified above, the process of this invention can be used to form a class of cevanidane compounds with hypertensive activity having an oxygen substituent at C–3, olefinic unsaturation at C–16, and hydrogen at the C–18 position. Thus, 3-beta-hydroxy-5,15-cevanidiene (XXXI) can be formed by reactivating 3-beta-methoxy, 5-solanidene-18-oic acid with acetic anhydride to form the 3-beta-methoxy, 16-alpha-acetoxy, 18-oxo-5-cevanidene, hydrolyzing to form 3-beta-methoxy, 16-alpha-hydroxy, 18-oxo-5-cevanidene and then by dehydration remove the 16-hydroxy and 15-hydrogen. By cleavage of the ether, XXXI is formed. This compound can also be formed by Hoffman degradation of isorubijervine monotosylate by refluxing it for 16 hours with one gram of potassium in 20 ml. of t-butanol, isolating with methylene chloride and removing the solvent. The melting point of XXXI is 227–230° C. after crystallization from acetone.

*Analysis.*—Calcd. for C$_{27}$H$_{40}$NO: C, 81.97; H, 10.45; N, 3.54. Found: C, 81.80; H, 10.36; N, 3.54.

We claim:

1. A process for rearranging the structure of a steroid having a tertiary nitrogen as a beta-substituent at the C–16 position and in which C–18 is the carbon of a carboxylic acid group having the following skeletal structure wherein the C, D and E rings have no substituents reactive with the COOH group to form a structure wherein said nitrogen is transferred to the C–18 position and an alpha-substituent selected from the group consisting of acyloxy and halide is introduced at the C–16 position having the following skeletal formula wherein Y is selected from the group consisting of acyloxy and halide, said process comprising reacting said steroid with an activating agent selected from the group consisting of anhydrides of carboxylic acids and halide compounds selected from the group consisting of halide compounds of sulfur and halide compounds of phosphorus which are reactive with carboxylic acid to form acyl halides.

2. A process for forming a cevanidane compound namely a compound having the following carbon-nitrogen skeletal structure and indicated substituents:

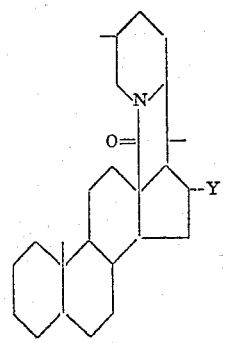

wherein Y is either acyloxy or halide, comprising reacting a solanidane-18-oic acid wherein the C, D and E rings have no substituents reactive with the COOH group with an activating agent selected from the group consisting of anhydrides of carboxylic acids and halide compounds selected from the group consisting of halide compounds of sulfur and halide compounds of phosphorus which are reactive with carboxylic acid to form acyl halides.

3. The process of claim 2 wherein the activating agent is acetic anhydride.

4. A process for forming a cevanidane compound having the following carbon-nitrogen skeletal structure and indicated substituents:

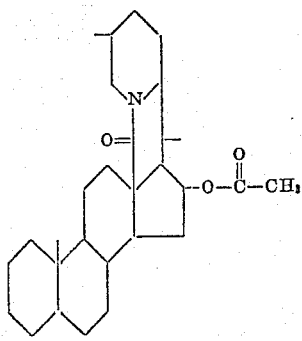

comprising reacting a solanidane-18-oic acid selected from the group consisting of 3-beta-acetoxy-5-solanidene-18-oic acid, solanidane-3-one-18-oic acid and 4-solanidene-3-one-18-oic acid with acetic anhydride.

5. 3-beta, 16-alpha diacetoxy-18-oxo-cevanidene having the following structural formula:

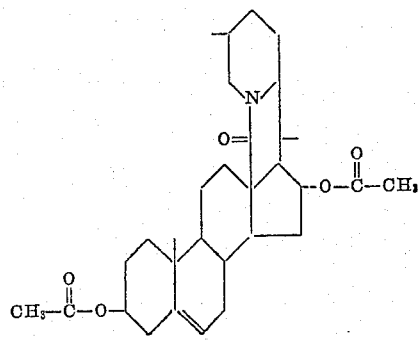

6. 3-beta, 16-alpha-dihydroxy-5-cevanidene having the following structural formula:

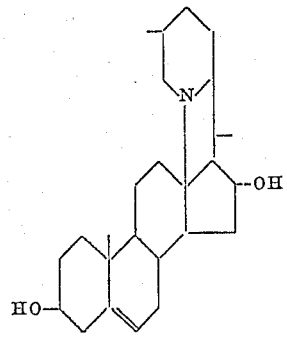

7. 16 - alpha-acetoxy - 18-oxocevanidane-3-one having the following structural formula:

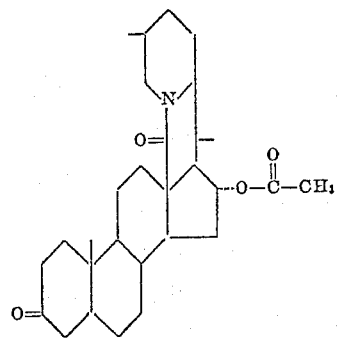

8. 16-alpha-acetoxy-18-oxo-4-cevanidene-3-one having the following structural formula:

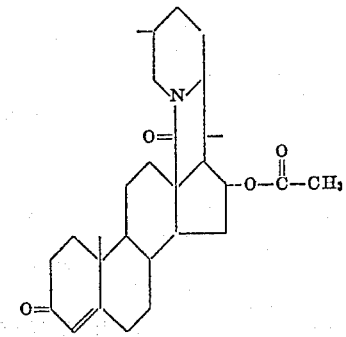

9. 16-alpha-hydroxy cevanidane-3-one having the following structural formula:

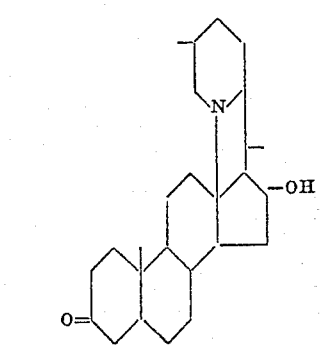

10. 16-alpha-hydroxy cevanidane-3-cycloethylene ketal methiodide having the following structural formula:

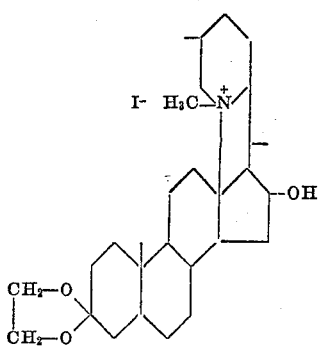

11. 3-beta-hydroxy-5,15-cevanidiene having the following structure:

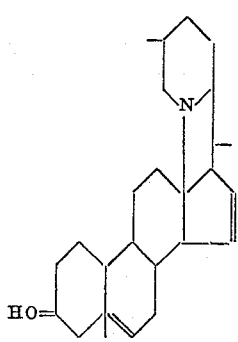

12. A cevanidane compound selected from the group of compounds consisting of the following structures:

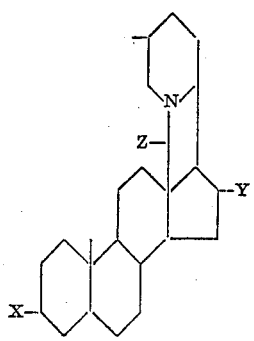

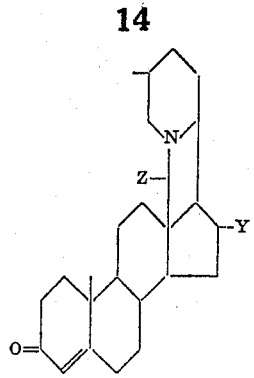

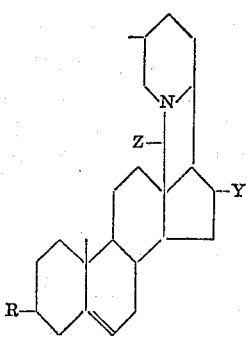

wherein Y is selected from the group consisting of hydrogen, oxo, hydroxy, acyloxy, arylsulfonoxy and chloro; Z is selected from the group consisting of hydrogen and oxo; X is selected from the group consisting of oxo, hydroxy, acyloxy and ketal; and R is selected from the group consisting of hydroxy, acyloxy and ketal; one of the group of constituents consisting of Y and Z being other than hydrogen.

13. The methiodide salt of the compound of claim 12 wherein Z is hydrogen.

References Cited in the file of this patent

UNITED STATES PATENTS 2,911,402    Tanabe et al. _____ Nov. 3, 1959

OTHER REFERENCES

Sheehan et al.: "J.A.C.S.," December 5, 1960 (vol. 82), page 6147.